(No Model.)

T. V. HARDISON & C. C. BOWMAN.
PLANTER.

No. 341,747. Patented May 11, 1886.

Witnesses
Robert Barrett
Dennis Sumby

Inventors
Thomas V. Hardison
Cornelius C. Bowman
By James L. Norris.
Atty.

UNITED STATES PATENT OFFICE.

THOMAS V. HARDISON AND CORNELIUS C. BOWMAN, OF WADESBOROUGH, NORTH CAROLINA.

PLANTER.

SPECIFICATION forming part of Letters Patent No. 341,747, dated May 11, 1886.

Application filed February 8, 1886. Serial No. 191,213. (No model.)

*To all whom it may concern:*

Be it known that we, THOMAS V. HARDISON and CORNELIUS C. BOWMAN, citizens of the United States, residing at Wadesborough, in the county of Anson and State of North Carolina, have invented new and useful Improvements in Planters, of which the following is a specification.

This invention relates to that class of machines which are adapted to plant seed in rows.

The invention consists in the construction and combination of parts, as hereinafter described and claimed.

Figure 1:
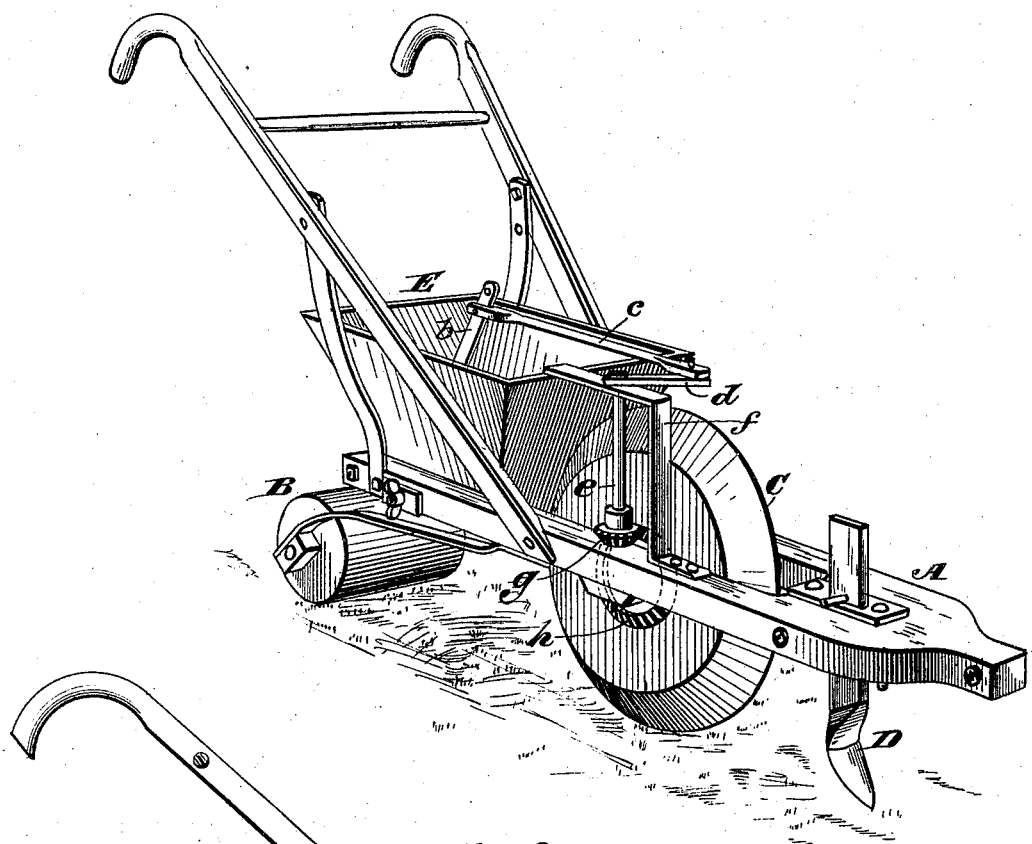
Figure 2:
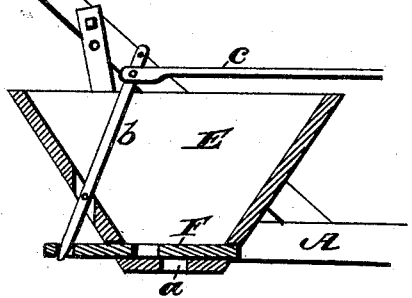
Figure 3:
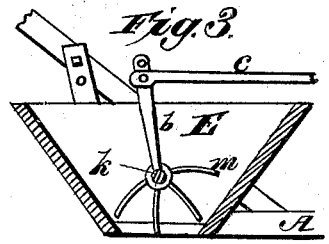

In the annexed drawings, illustrating the invention, Figure 1 is a perspective view of our improved planter. Fig. 2 is a sectional detail view of the seed-hopper, seed-slide, and actuating mechanism. Fig. 3 represents another device for facilitating the discharge of the seed.

The frame A, of any suitable construction, is supported by the covering-roller B and furrow-wheel C, and carries a cultivator-blade, D, at its forward end.

On the rear end of the frame A is supported the seed-hopper E, in the bottom of which is a seed-exit opening, $a$. The discharge of seed through this opening may be regulated by a slide, F, having an arm, $b$, actuated by a pitman, $c$, that extends forward over the front end of the hopper. To the forward end of this pitman $c$ is connected a crank, $d$, which is carried by a vertical rod or shaft, $e$, that is journaled at its lower end in one side of the frame A, and at its upper end in a bearing, $f$, attached to the hopper and machine-frame. The shaft $e$ carries a bevel-gear, $g$, which meshes with a pinion, $h$, on the side of the furrow-wheel. By the rotation of the furrow-wheel C, the shaft $e$ and crank $d$ are caused to actuate the pitman $c$ and slide-arm $b$ so as to reciprocate the regulator slide F in or over the seed-opening, and thereby control the discharge of seed to the furrow made in the soil by the furrow-wheel C and cultivator D. After the seed enters the soil it is covered by the roller B; or, in lieu of a roller, a covering-board may be employed.

The covering roller or board, as the case may be, can be attached to the rear end of the machine-frame by spring-connections, so as to be held in close contact with the soil, and the spring-connections may have means of adjustment by which the pressure of the covering device can be regulated.

If preferred, the seed-slide F may be replaced by a rock-shaft, $k$, journaled in the hopper E, and carrying a series of stirring-fingers, $m$, as shown in Fig. 3, to force the seed through the feed-opening. This shaft $k$ will be provided with an arm, $b$, for attachment to the pitman $c$, the shaft $k$ and attached fingers $m$ being thus actuated by the same mechanism that at other times may be used to operate the seed-slide. It will therefore be seen that the same driving mechanism is adapted to actuate either the stirring-fingers or the seed-slide.

The width of the feed-opening in the bottom of the hopper can be regulated by means of a block or strip adjusted by a thumb-screw, $p$. (Shown in Fig. 1.)

The hopper E and its feed mechanism will feed either dry or rolled seeds. By disconnecting the pitman $c$ and crank $d$, the feed can be stopped without stopping the machine.

The machine is simple, cheap, and compact, and can be easily controlled so as to perform its work efficiently.

Having thus described our invention, what we claim is—

1. In a planter, the combination of a seed-hopper having a feed-opening and a feed-regulator provided with an arm, a furrow-wheel having a pinion on one side, a vertical shaft having at its lower end a gear meshing with said pinion, a crank secured to the upper end of said shaft, and a pitman connecting said crank to the feed-regulator arm, substantially as described.

2. In a planter, the combination of the frame A, having bearing $f$, furrow-wheel C, covering-roller B, and cultivator-blade D, the seed-hopper E, having a feed-opening, $a$, and a feed-regulator provided with arm $b$, the pitman $c$, crank $d$, shaft $e$, journaled in the bearing $f$, and frame A, the gear $g$ on the shaft $e$, and the pinion $h$ on the furrow-wheel, substantially as described.

In testimony whereof we affix our signatures in presence of two witnesses.

THOMAS V. HARDISON.
CORNELIUS C. BOWMAN.

Witnesses:
W. P. COVINGTON,
J. D. McSUGER.